(12) United States Patent
Tago

(10) Patent No.: US 11,618,161 B2
(45) Date of Patent: Apr. 4, 2023

(54) ROBOT HAND CONTROLLER, ROBOT SYSTEM, AND ROBOT HAND CONTROL METHOD

(71) Applicant: FANUC CORPORATION, Yamanashi (JP)

(72) Inventor: Mizuki Tago, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 401 days.

(21) Appl. No.: 16/898,882

(22) Filed: Jun. 11, 2020

(65) Prior Publication Data
US 2021/0023701 A1 Jan. 28, 2021

(30) Foreign Application Priority Data
Jul. 23, 2019 (JP) .............................. JP2019-134980

(51) Int. Cl.
| | | |
|---|---|---|
| *B25J 9/16* | (2006.01) | |
| *B25J 15/00* | (2006.01) | |
| *G06T 1/00* | (2006.01) | |
| *B25J 13/08* | (2006.01) | |
| *G06V 20/68* | (2022.01) | |
| *G06V 20/10* | (2022.01) | |

(52) U.S. Cl.
CPC ........... *B25J 9/1612* (2013.01); *B25J 9/1697* (2013.01); *B25J 13/08* (2013.01); *B25J 15/0023* (2013.01); *G06T 1/0014* (2013.01); *G06V 20/10* (2022.01); *G06V 20/68* (2022.01)

(58) Field of Classification Search
USPC .................................................. 700/245–264
See application file for complete search history.

(56) References Cited

U.S. PATENT DOCUMENTS

| | | | |
|---|---|---|---|
| 7,920,124 B2* | 4/2011 | Tokita | G06F 3/016 345/173 |
| 10,569,422 B2* | 2/2020 | Curhan | B25J 15/0023 |
| 2002/0193908 A1* | 12/2002 | Parker | G06N 3/008 700/258 |
| 2012/0072022 A1* | 3/2012 | Kim | B25J 9/1666 700/255 |
| 2012/0078419 A1* | 3/2012 | Kim | B25J 9/1669 700/255 |

(Continued)

FOREIGN PATENT DOCUMENTS

| | | |
|---|---|---|
| JP | H08-197475 A | 8/1996 |
| JP | H09109075 A | 4/1997 |

(Continued)

*Primary Examiner* — Jonathan L Sample
(74) *Attorney, Agent, or Firm* — Maier & Maier, PLLC

(57) ABSTRACT

A robot hand controller includes an air supply unit configured to supply air into fingers of a robot hand and configured to discharge air in the fingers, and a controller configured to control the air supply unit, where the air supply unit includes two or more air passages respectively connected to the different fingers, the air passages capable of supplying the air into the fingers and discharging the air in the fingers independently from each other, and the controller controls supply and discharge of the air through each of the two or more air passages in response to a shape of the workpiece and an object in a vicinity of a transport destination of the workpiece.

7 Claims, 5 Drawing Sheets

(56) References Cited

U.S. PATENT DOCUMENTS

| | | | |
|---|---|---|---|
| 2013/0054025 A1* | 2/2013 | Ito .......................... | G05B 19/42 |
| | | | 700/246 |
| 2013/0345875 A1* | 12/2013 | Brooks ................. | G05B 19/42 |
| | | | 700/258 |
| 2019/0030714 A1* | 1/2019 | Knopf ..................... | B25J 9/142 |
| 2019/0056248 A1* | 2/2019 | Shepherd ................ | B25J 15/12 |
| 2019/0321984 A1* | 10/2019 | Yamazaki ............... | B25J 15/12 |
| 2019/0351549 A1* | 11/2019 | Suzuki ................... | B25J 9/1697 |
| 2019/0375602 A1* | 12/2019 | Katagiri ................ | G06F 3/0484 |
| 2020/0021743 A1* | 1/2020 | Yoshida ................ | H04N 23/50 |

FOREIGN PATENT DOCUMENTS

| | | |
|---|---|---|
| JP | 2003-191193 A | 7/2003 |
| JP | 2018-086717 A | 6/2018 |

* cited by examiner

ROBOT HAND CONTROLLER, ROBOT SYSTEM, AND ROBOT HAND CONTROL METHOD

CROSS-REFERENCE TO RELATED APPLICATIONS

This application is based on and claims priority to Japanese Patent Application No. 2019-134980 filed on Jul. 23, 2019, the content of which is incorporated herein by reference in its entirety.

FIELD

The present invention relates to a robot hand controller, a robot system, and a robot hand control method.

BACKGROUND

Conventionally, there is known a robot hand having a plurality of flexible fingers (cf. Japanese Unexamined Patent Application, Publication No. H08-197475; Japanese Unexamined Patent Application, Publication No. 2003-191193; and Japanese Unexamined Patent Application, Publication No. 2018-086717). The fingers are made of an elastic material such as rubber, and are deformed according to a contour of a workpiece. Using such fingers, it is possible to hold a soft workpiece such as food without damaging the food.

SUMMARY

One aspect of the present disclosure relates to a robot hand controller of a robot hand having a plurality of hollow fingers for holding a workpiece, wherein each of the plurality of fingers becomes an opened state and closed state by being deformed in response to an air pressure in an inside of the finger, the robot hand controller including, an air supply unit configured to supply air into the plurality of fingers, and configured to discharge air in the plurality of fingers; and a controller configured to control the air supply unit, wherein the air supply unit includes two or more air passages respectively connected to the fingers, the air passages capable of supplying the air into the fingers and capable of discharging the air in the fingers independently from each other, and the controller controls supply and discharge of the air through each of the two or more air passages in response to a shape of the workpiece and an object around a transport destination of the workpiece.

DETAILED DESCRIPTION OF EMBODIMENT

Figure 1:
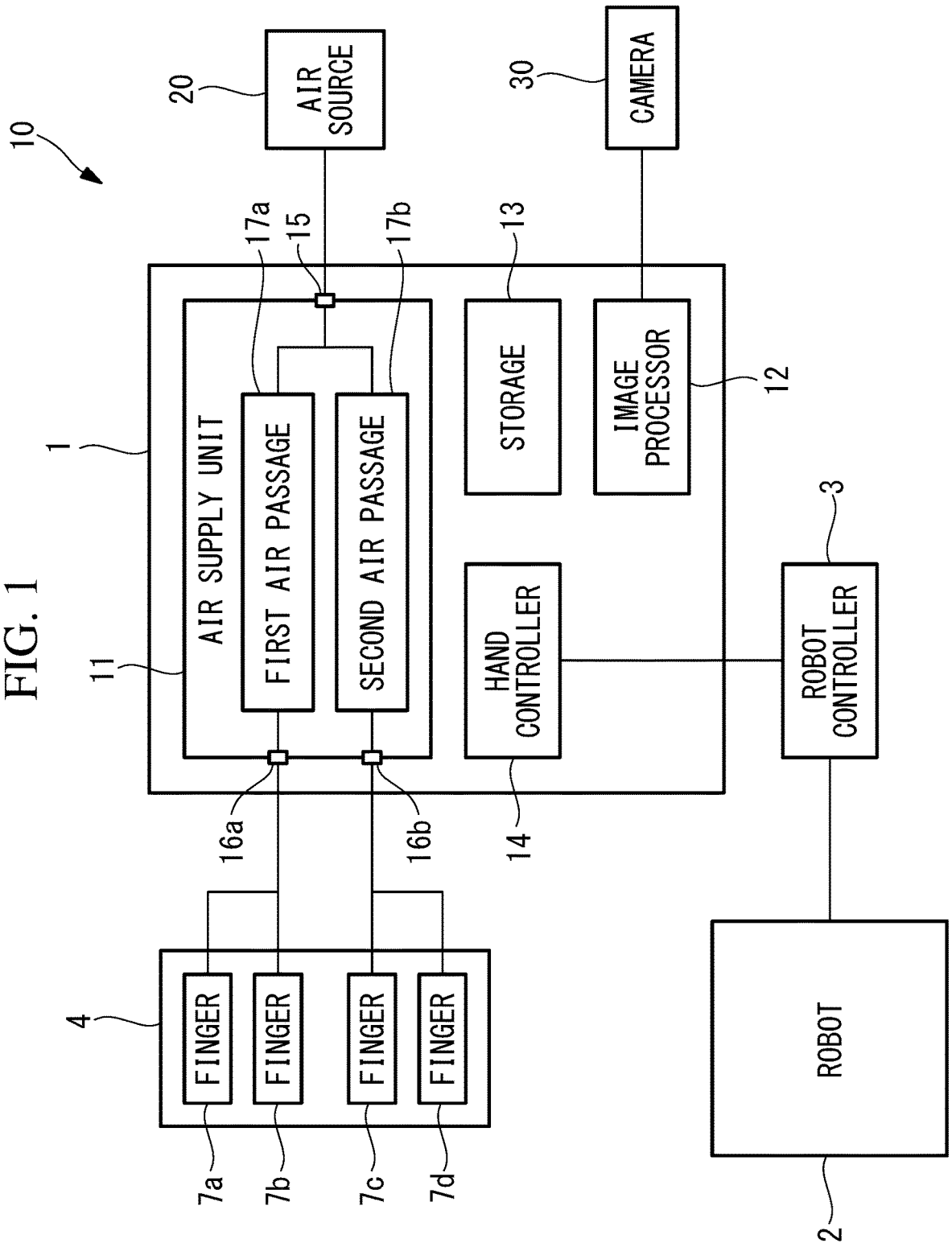
FIG. 1 is a block diagram illustrating a configuration of a robot hand controller and a robot system.

Hereinafter, a robot system 10 according to one embodiment will be described with reference to the drawings. As shown in FIG. 1, the robot system 10 includes: a robot 2; a robot controller 3 that controls the robot 2; a robot hand 4 connected to the robot 2; and a robot hand controller 1 that controls the robot hand 4.

The robot 2 is an industrial robot of any type which is commonly used in transportation of workpieces. Examples of such a robot include a vertical articulated robot, a horizontal articulated robot and a parallel link robot. The robot hand 4 is connected to a tip end of a robot arm of the robot 2, and is moved by movements of the robot arm.

The robot controller 3 is connected with the robot 2. The robot controller 3 includes: a processor and a storage having a RAM, a ROM, and the like. The storage stores an operation program for transporting a workpiece from a predetermined feed position to a predetermined transport destination. Controlling of the robot 2 by the robot controller 3 described later is realized by the processor executing a process according to the operation program.

Figure 2:
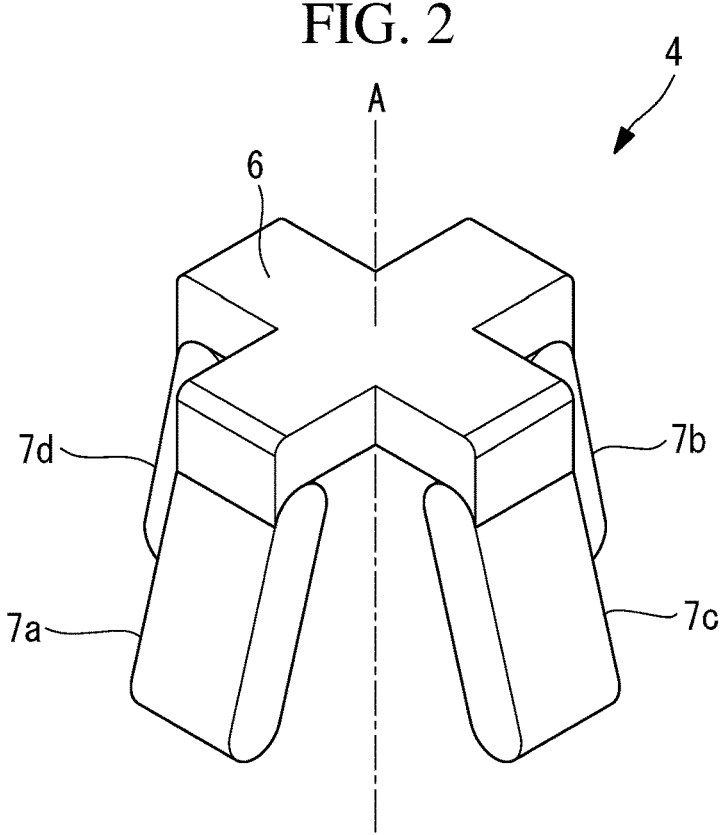
FIG. 2 is a schematic view illustrating a configuration of a robot hand.

As shown in FIG. 2, the robot hand 4 includes: a base 6 connected to the tip end of the robot arm; and two pairs of fingers 7a, 7b; 7c, 7d connected to the base 6. The fingers 7a, 7b, 7c, and 7d are arranged in a circumferential direction about a central axis A of the base 6, and a base end of each of the fingers 7a, 7b, 7c, and 7d is connected to the base 6. The first pair of fingers 7a, 7b are opposed to each other in a first direction that is orthogonal to the central axis A, and mutually openable and closable in the first direction. The second pair of fingers 7c, 7d are opposed to each other in a second direction that is orthogonal to the central axis A and the first direction, and mutually openable and closable in the second direction.

Figure 3:
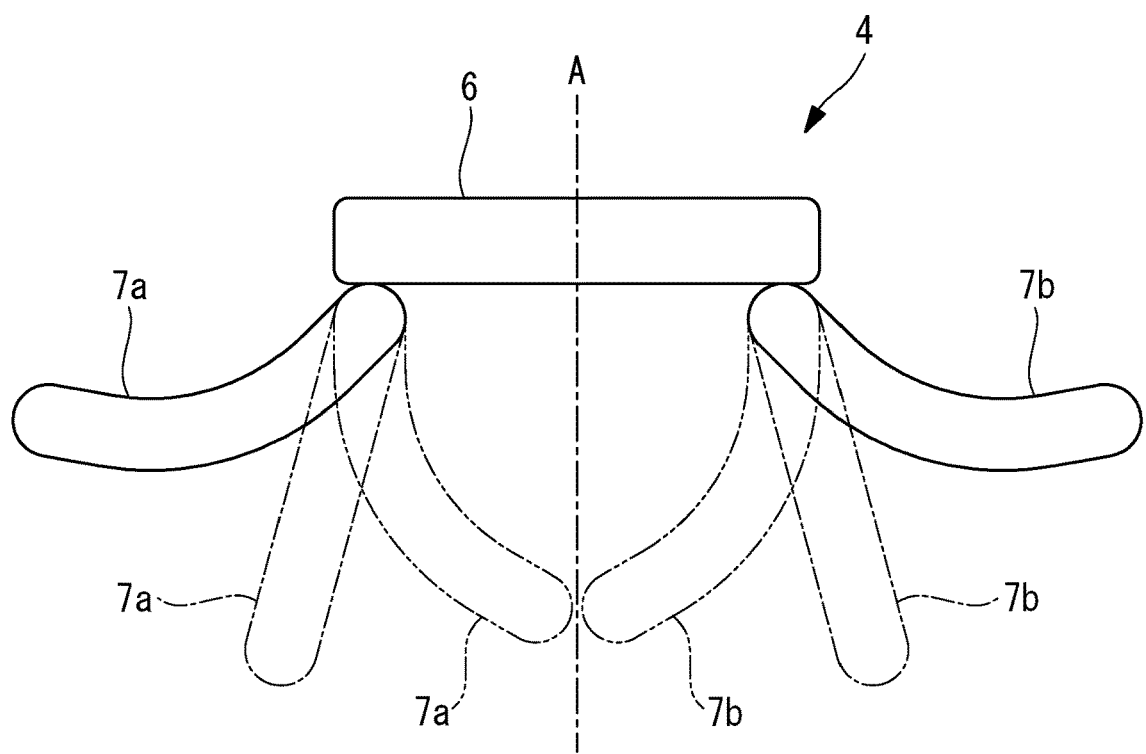
FIG. 3 is a schematic view illustrating an open/close operation of a first pair of fingers of the robot hand.

The fingers 7a, 7b, 7c, and 7d are hollow, and made of an elastic material such as rubber. As shown in FIG. 3, each of the fingers 7a, 7b, 7c, and 7d opens and closes by being deformed between an opened state (open shape) and a closed state (close shape) in response to an air pressure within corresponding one of the fingers 7a, 7b, 7c, and 7d. As shown in FIG. 3 by a solid line, the opened state is a state in which the fingers 7a, 7b, 7c, and 7d extend toward a direction opposite of the central axis A. In the opened state, tip ends of the fingers 7a, 7b, 7c, and 7d are disposed at positions farther away from the central axis A than the base ends of the fingers 7a, 7b, 7c, and 7d. As shown in FIG. 3 by an alternate long and two short dashes line, the closed state is a state in which the fingers 7a, 7b, 7c, and 7d are curved toward the central axis A. In the close shape, the tip ends of the fingers 7a, 7b, 7c, and 7d are disposed at positions closer to the central axis A than the base ends of the fingers 7a, 7b, 7c, and 7d. Therefore, the fingers 7a, 7b, 7c, and 7d swing to the central axis A centering the base end, while being deformed from the opened state to the closed state.

For example, an outer surface of each of the fingers 7a, 7b, 7c, and 7d, opposite of the central axis A, has an accordion structure, and is extensible in a longitudinal direction. On the other hand, an inner surface of each of the fingers 7a, 7b, 7c, and 7d, on a side of the central axis A, does not extend rarely or at all in the longitudinal direction, and has a fixed size in the longitudinal direction. Each of the fingers 7a, 7b, 7c, and 7d deforms from the open shape to the close shape as the outer surface extends in response to an increase of an air pressure therein by air supply. Further, each of the fingers 7a, 7b, 7c, and 7d deforms from the close shape to the open shape as the outer surface contracts in response to a decrease of the air pressure by air discharge. Each of the fingers 7a, 7b, 7c, and 7d may be configured to deform from the close shape to the open shape by supplying the air pressure, and to deform from the open shape to the close shape by discharging the air pressure.

As shown in FIG. 1, the robot hand controller 1 includes: an air supply unit 11; an image processor 12; a storage 13; and a hand controller (controller) 14. The robot hand controller 1 may be completely separate from the robot controller 3. Specifically, the air supply unit 11, the image processor 12, the storage 13, and the hand controller 14 may be provided within another housing separate from a housing of the robot controller 3. Alternatively, a part of a configuration of the robot hand controller 1 may be provided in the robot controller 3, and the remaining part of the configuration of the robot hand controller 1 may be provided separately from the robot controller 3. For example, the image processor 12, the storage 13, and the hand controller 14 may be provided in the robot controller 3, and the air supply unit 11 may be provided within a housing separate from the housing of the robot controller 3. In this case, the storage 13 may be realized by the storage of the robot controller 3, and the image processor 12 and the hand controller 14 may be realized by the processor of the robot controller 3.

The air supply unit 11 includes: a single air inlet 15; two air outlets 16a and 16b; and two air passages 17a and 17b. The air inlet 15 is connected to an air source 20 such as an air compressor, and a compressed air is supplied to the two air passages 17a and 17b from the air source 20 via the air inlet 15.

The two air passages 17a and 17b are connected, respectively through the different air outlets 16a and 16b, respectively to the different fingers 7a, 7b; 7c, 7d. Specifically, the first air passage 17a is connected to the first pair of fingers 7a, 7b through the first air outlet 16a, and the second air passage 17b is connected to the second pair of fingers 7c, 7d through the second air outlet 16b.

The first air passage 17a simultaneously supplies air into the fingers 7a, 7b, and simultaneously discharges air from the fingers 7a, 7b. The fingers 7a, 7b are closed simultaneously by the supply of air, and the fingers 7a, 7b are opened simultaneously by the discharge of air. The second air passage 17b simultaneously supplies air into the fingers 7c, 7d, and simultaneously discharges air from the fingers 7c, 7d. The fingers 7c, 7d are closed simultaneously by the supply of air, and the fingers 7c, 7d are opened simultaneously by the discharge of air.

The first air passage 17a includes: a supply mechanism for regulating a pressure and a flow rate of air to be supplied to the fingers 7a, 7b; and a discharge mechanism for discharging air from the fingers 7a, 7b. The second air passage 17b also includes: a supply mechanism for regulating a pressure and a flow rate of air to be supplied to the fingers 7c, 7d; and a discharge mechanism for discharging air from the fingers 7c, 7d, separately from the supply mechanism and the discharge mechanism of the first air passage 17a. Therefore, the first and the second air passages 17a and 17b are capable of supplying air independently to the first pair of fingers 7a, 7b and the second pair of fingers 7c, 7d, respectively, and discharging air independently from the first pair of fingers 7a, 7b and the second pair of fingers 7c, 7d, respectively. Specifically, it is possible to control opening and closing of the first pair of fingers 7a, 7b independently from opening and closing of the second pair of fingers 7c, 7d.

As one example, each of the air passages 17a and 17b includes: a regulator for regulating a pressure of compressed air supplied from the air source 20 and a speed controller for regulating a flow rate of the air, as the supply mechanism, and an air ejector, as the discharge mechanism, for discharging air by supplying the compressed air. Further, each of the air passages 17a and 17b includes: a switching valve. A compressed air from the air source 20 is supplied to one of the supply mechanism and the discharge mechanism selectively by switching of the switching valve.

The image processor 12 is connected to a camera 30. The camera 30 is fixed to a tip end portion of the robot hand 4 or the robot arm, for example. Alternatively, the camera 30 may be disposed above each of the feed position and the transport destination. According to control by the robot controller 3, the camera 30 acquires an image including a workpiece to be held at the feed position, as well as an image including the transport destination and the vicinity of the transport destination, and transmits the acquired images to the image processor 12.

The image processor 12 receives the image of the workpiece to be held at the feed position from the camera 30. The image processor 12 detects the workpiece in the image, and measures a contour of the workpiece. For example, the image processor 12 measures, as the contour of the workpiece, external dimensions of the workpiece in two directions orthogonal to each other. The two directions respectively correspond to a direction for holding the workpiece by the first pair of fingers 7a, 7b (first direction) and a direction for holding the workpiece by the second pair of fingers 7c, 7d (second direction). Further, the image processor 12 receives the image of the transport destination from the camera 30, and detects, as an obstacle, an object in the vicinity of the transport destination in the image. The image processor 12 includes a processor, and executes the process described above using the processor.

The storage 13 includes a storage device such as a RAM and a ROM. The storage 13 stores a database in which holding data of a plurality of types of workpieces are recorded. Holding data of each workpiece includes: the image of the workpiece acquired by the camera 30; the contour of the workpiece measured by the image processor 12; and closing pattern data. The closing pattern data is data indicating closing patterns of the fingers 7a, 7b, 7c, and 7d, and includes information indicating open or close of the first pair of fingers 7a, 7b and information indicating open or close of the second pair of fingers 7c, 7d.

There are three closing patterns, and closing pattern data for each workpiece is set according to a shape of each workpiece. A first closing pattern is a pattern in which all of the first pair of fingers 7a, 7b and the second pair of fingers 7c, 7d are closed (cf. FIG. 5). A second closing pattern is a pattern in which only the first pair of fingers 7a, 7b are closed. A third closing pattern is a pattern in which only the second pair of fingers 7c, 7d are closed (cf. FIG. 4). In the closing pattern data, non-closing fingers are set to be opened and closing fingers are set to be closed.

Figure 4:
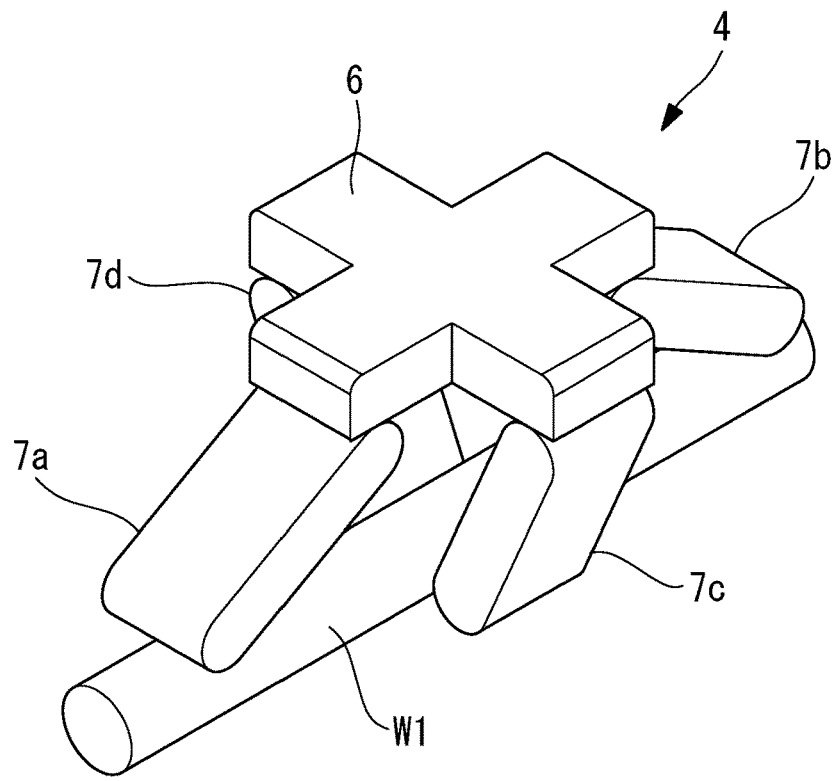
FIG. 4 is a view illustrating one example of a holding operation of a workpiece by the robot hand.
Figure 5:
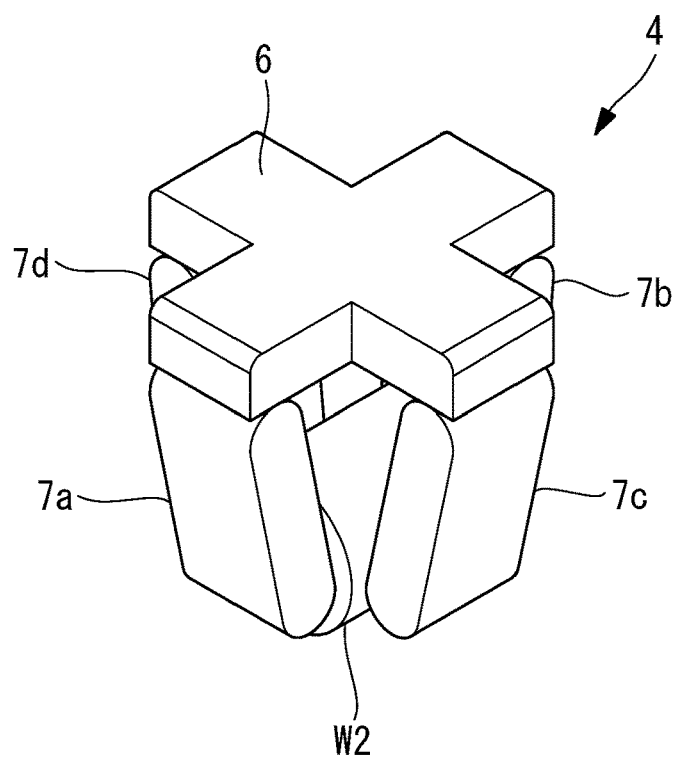
FIG. 5 is a view illustrating another example of the holding operation of the workpiece by the robot hand.

FIG. 4 shows a closing pattern for a workpiece W1, which is in an elongated rod-like shape, and FIG. 5 shows a closing pattern for a workpiece W2, which is in a short cylindrical shape. In the example shown in FIG. 4, the holding direction of the first pair of fingers 7a, 7b corresponds to a longitudinal direction of the workpiece W1, and the holding direction of the second pair of fingers 7c, 7d corresponds to a radial direction of the workpiece W1. In this example, the second pair of fingers 7c, 7d are able to hold the workpiece W1, but the first pair of fingers 7a, 7b are not able to hold the workpiece W1. Therefore, in the closing pattern data for the workpiece W1, the first pair of fingers 7a, 7b are set to be opened, and the second pair of fingers 7c, 7d are set to be closed.

In the example shown in FIG. 5, the holding direction of the first pair of fingers 7a, 7b corresponds to a longitudinal direction of the workpiece W2, and the holding direction of the second pair of fingers 7c, 7d corresponds to a radial direction of the workpiece W2. In this example, both of the first pair of fingers 7a, 7b and the second pair of fingers 7c, 7d are able to hold the workpiece W2. Therefore, in the closing pattern data for the workpiece W2, both of the first pair of fingers 7a, 7b and the second pair of fingers 7c, 7d are set to be closed.

The hand controller 14 includes a processor, and executes the process described later using the processor. The hand controller 14 controls opening and closing of the first pair of fingers 7a, 7b by controlling the first air passage 17a, and controls opening and closing of the second pair of fingers 7c, 7d by controlling the second air passage 17b. Specifically, the hand controller 14 opens the first pair of fingers 7a, 7b by controlling the first air passage 17a to supply air to the first pair of fingers 7a, 7b, and closes the first pair of fingers 7a, 7b by controlling the first air passage 17a to discharge air from the first pair of fingers 7a, 7b. Further, the hand controller 14 opens the second pair of fingers 7c, 7d by controlling the second air passage 17b to supply air to the second pair of fingers 7c, 7d, and closes the second pair of fingers 7c, 7d by controlling the second air passage 17b to discharge air from the second pair of fingers 7c, 7d.

The hand controller 14 communicates with the robot controller 3, and controls a closing operation and an opening operation of the fingers 7a, 7b, 7c, and 7d by controlling the air supply unit 11 in synchronization with movements of the robot hand 4 between the feed position and the transport destination by the operation of the robot 2.

In controlling of the closing operation of the fingers 7a, 7b, 7c, and 7d, the hand controller 14 controls the air supply unit 11 based on closing pattern data for a workpiece to be held by the robot hand 4. Specifically, based on the image of the workpiece from the camera 30, for example, the hand controller 14 reads holding data of a workpiece to be held from the database within the storage 13. Next, the hand controller 14 closes only the fingers that are set to be closed, based on the closing pattern data included in the holding data, that is, by controlling the air passages 17a and 17b according to the shape of the workpiece.

If the holding data of a workpiece to be held is not found in the database within the storage 13, the hand controller 14 creates holding data of this workpiece to be held and records the holding data in the database. Specifically, based on the contour of the workpiece measured by the image processor 12, the hand controller 14 determines whether or not each of the first pair of fingers 7a, 7b and the second pair of fingers 7c, 7d is able to hold the workpiece. The determination on whether or not the workpiece may be held is made, for example, by comparing the external dimensions of the workpiece with maximum values of external dimensions of a workpiece that can be stably held by the first pair of fingers 7a, 7b and the second pair of fingers 7c, 7d. The hand controller 14 creates closing pattern data by setting a finger that is able to hold the workpiece to be closed, and a finger that is not able to hold the workpiece to be opened. Then, the hand controller 14 creates holding data including the image of the workpiece to be held, the contour of the workpiece, and the closing pattern data.

Further, after the closing operation of the fingers 7a, 7b; 7c, 7d, the hand controller 14 controls the air supply unit 11 according to an obstacle in the vicinity of the transport destination detected by the image processor 12. Specifically, if an obstacle in the vicinity of the transport destination is detected by the image processor 12, the hand controller 14 predicts whether or not each of the fingers 7a, 7b, 7c, and 7d interferes with the obstacle during placement of the workpiece at the transport destination and during the opening operation of the closed fingers. The presence of the interference is predicted, for example, by comparing an area occupied by each of the fingers 7a, 7b, 7c, and 7d with an area occupied by the obstacle. If it is predicted that any of the fingers 7a, 7b, 7c, and 7d will be interfered with the obstacle, the hand controller 14 opens a finger that is predicted to interfere with the obstacle by controlling the air supply unit 11 prior to transportation of the workpiece to the transport destination.

Figure 6:
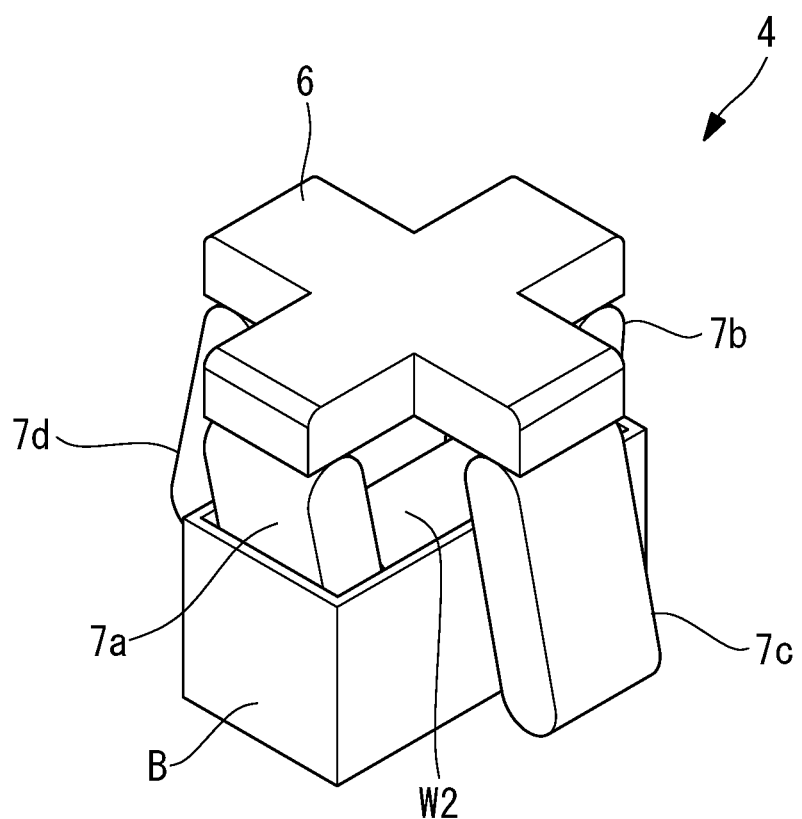
FIG. 6 is a view illustrating another example of the holding operation of the workpiece by the robot hand.

FIG. 6 shows a case in which the workpiece W2 in FIG. 5 is to be placed within a box B that is disposed at the transport destination. In the example shown in FIG. 6, side walls of the box B surrounding the transport destination are obstacle, and the fingers 7c, 7d that hold the workpiece W2 interfere with the box B. In this case, the second pair of fingers 7c, 7d are opened, and the workpiece W2 is held only using the first pair of fingers 7a, 7b. Thereafter, the workpiece W2 is placed within the box B.

Figure 7:
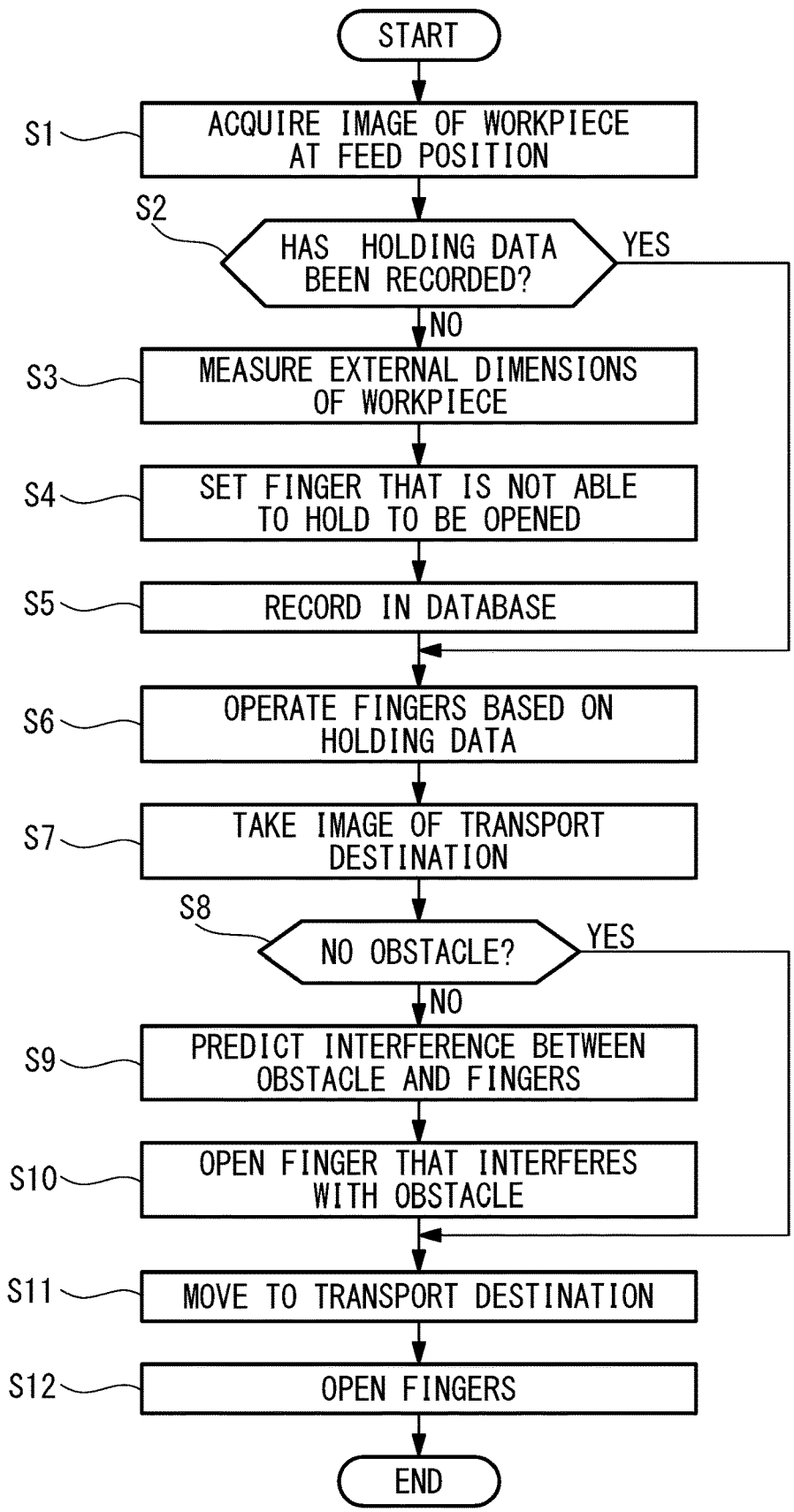
FIG. 7 is a flowchart showing an operation of a robot system in a transportation operation of the workpiece.

Next, an operation of the robot system 10 will be described with reference to FIG. 7. By the robot controller 3 controlling the robot 2, the robot hand 4 is positioned above the feed position. At the feed position, workpieces are fed at time intervals by a workpiece feeder that is not shown. Next, by the robot controller 3 controlling the camera 30, an image of the workpiece to be held at the feed position is acquired (Step S1). The image is transmitted from the camera 30 to the robot hand controller 1. Then, by the robot controller 3 controlling the robot 2, the robot hand 4 is positioned at the feed position.

With the robot hand controller 1, the workpiece to be held in the image is detected by the image processor 12. Then, the controller 14 confirms whether or not the holding data of the detected workpiece has already been recorded in the database (Step S2). If recorded (YES in Step S2), the process proceeds to a holding operation of the workpiece by the robot hand 4 in Step S6.

If not recorded yet (NO in Step S2), the holding data of the workpiece to be held is newly created (Step S3, S4). Specifically, a contour of the workpiece is measured by the image processor 12 (Step S3). Then, the hand controller 14 determines whether or not the first pair of fingers 7a, 7b and the second pair of fingers 7c, 7d are able to hold the workpiece based on the contour of the workpiece, and closing pattern data in which a finger that is not able to hold the workpiece is set to be opened is created (Step S4). The created holding data is recorded in the database (Step S5).

Next, the hand controller 14 reads the holding data of the detected workpiece from the database, and the air supply unit 11 is controlled based on the closing pattern data in the holding data (Step S6). With this, according to a shape of the workpiece to be held, one or both the first pair of fingers 7a, 7b and the second pair of fingers 7c, 7d are closed and the workpiece is held by the robot hand 4.

After holding of the workpiece by the robot hand 4, by the robot controller 3 controlling the robot 2, the robot hand then moves above the transport destination from the feed position. Next, by the robot controller 3 controlling the camera 30, an image including portions in the vicinity of the transport destination and the transport destination (Step S7) is acquired. The image is transmitted from the camera 30 to the robot hand controller 1. With the robot hand controller 1, if there is an obstacle such as the box B is present around the transport destination in the image, the obstacle is detected by the image processor 12 (NO in Step S8). If no obstacle is detected (YES in Step S8), the process proceeds to movement of the robot hand 4 to the transport destination in Step S11.

After detecting the obstacle (NO in Step S8), the hand controller 14 predicts whether or not the fingers 7a, 7b, 7c, and 7d interfere with the obstacle during placement of the workpiece at the transport destination and during the opening operation of the fingers 7a, 7b, 7c, and 7d (Step S9). Any finger that is predicted to interfere with the obstacle is opened by the hand controller 14 by controlling the air supply unit 11 (Step S10). Next, by the robot controller 3 controlling the robot 2, the robot hand 4 is positioned at the transport destination, and the workpiece is placed at the transport destination (Step S11). Next, by the hand controller 14 controlling the air supply unit 11, all of the fingers 7a, 7b, 7c, and 7d of the robot hand 4 are opened and the workpiece is released (Step S12).

As described above, according to this embodiment, opening and closing of the first pair of fingers 7a, 7b and opening and closing of the second pair of fingers 7c, 7d are respectively controlled by the separate air passages 17a and 17b. With this, the closing pattern of the fingers 7a, 7b, 7c, and 7d may be changed according to the shapes of the workpieces W1 and W2, and it is possible to hold the workpieces W1 and W2 of various types with different contours using the single robot hand 4. As one example, when all of the fingers 7a, 7b, 7c, and 7d are controlled by a common air passage, as all of the fingers 7a, 7b, 7c, and 7d close at the same time, it is not possible to hold the workpiece W1 shown in FIG. 4 using the robot hand 4. According to the robot hand controller 1, even such a workpiece W1 may be held using the robot hand 4.

Further, as shown in FIG. 5 and FIG. 6, the same workpieces W2 may be held in a plurality of closing patterns. With this, for example, when there is an obstacle such as the box B in the vicinity of the transport destination, by changing the closing pattern according to the obstacle after holding the workpiece, a finger for which interference with the obstacle is predicted may be moved to a position that does not interfere. With this, it is possible to reliably transport the workpiece to the transport destination.

While the hand controller 14 may control each of the fingers 7a, 7b, 7c, and 7d selectively to be the open shape and the close shape, the hand controller 14 may also control each of the fingers 7a, 7b, 7c, and 7d to be any shape between the open shape and the close shape. In this case, by the hand controller 14 controlling an amount of air supply to the fingers 7a, 7b by the first air passage 17a, the hand controller 14 adjusts an opening angle (opening amount) of each of the fingers 7a, 7b to an arbitrary angle between a maximum angle and a minimum angle. Similarly, by the hand controller 14 controlling an amount of air supply to the fingers 7c, 7d by the second air passage 17b, the hand controller 14 adjusts an opening angle (opening amount) of each of the fingers 7c, 7d to an arbitrary angle between a maximum angle and a minimum angle. The opening angle is an angle that the central axis A makes with the longitudinal direction of each of the fingers 7a, 7b, 7c, and 7d. The amount of air supply is controlled, for example, by controlling a time length for supplying air to the fingers 7a, 7b, 7c, 7d, or by controlling a pressure of air supplied to the fingers 7a, 7b, 7c, 7d.

According to this configuration, the workpiece may be held with a weaker force, by adjusting the opening angles of the fingers 7a, 7b, 7c, and 7d according to the external dimensions of the workpiece so that a holding width between the tip ends of the first pair of fingers 7a, 7b and a holding width between the tip ends of the second pair of fingers 7c, 7d are substantially equal to the external dimensions of the workpiece. This is especially advantageous when holding a workpiece that is soft and easily deforms like food. For example, in a case in which the first pair of fingers 7a, 7b are controlled to be the close shape when holding the workpiece W2, the inner surfaces of the fingers 7a, 7b are brought into contact with the workpiece W2 strongly, and a compression force is applied to the workpiece W2 in the longitudinal direction. In contrast, it is possible to hold the workpiece W2 lightly by adjusting the holding width between the first pair of fingers 7a, 7b to be substantially equal to the external dimensions of the workpiece W2 in the longitudinal direction. Further, it is possible to adjust the holding width between the tip ends of the first pair of fingers 7a, 7b and the holding width between the tip ends of the second pair of fingers 7c, 7d independently from each other. Therefore, even a workpiece having different dimensions in the longitudinal direction and the lateral direction, like the workpiece W2, may be held with a weak force.

In the above embodiment, the robot hand 4 has the four fingers 7a, 7b, 7c, and 7d. However, a number of the fingers of the robot hand 4 is not limited to four, and may be two, three, or more than four. In the above embodiment, the air supply unit 11 includes the two air passages 17a and 17b. However, instead, the air supply unit 11 may include three or more air passages. For example, when the robot hand 4 has three pairs of fingers, the air supply unit 11 may include three air passages respectively connected to different fingers. Alternatively, the air supply unit 11 may include air passages respectively connected to different fingers, where the number of the air passages is the same as that of the fingers.

In the above embodiment, the workpieces W1 and W2 of a plurality of types with different contours are transported using the robot hand 4. However, instead, workpieces of the same type with the same contour may be transported. In this case, it is not necessarily required to recognize the workpiece based on the image of the workpiece at the feed position. Therefore, Steps S2 to S5 may be omitted. Specifically, by the hand controller 14 controlling the air supply unit 11 based only on closing pattern data of a predetermined one holding data, the fingers 7a, 7b, 7c, and 7d may be closed every time with the same closing pattern.

Further, when there is a predetermined obstacle around the transport destination, such as in an operation in which the same type of the workpiece W2 is packed in the same type of the box B disposed at the same position, it is not necessarily required to recognize the obstacle based on the image of the transport destination. Therefore, Steps S7 to S9 may be omitted in this case. Specifically, the hand controller 14 may open a predetermined finger every time prior to transportation of the workpiece to the transport destination.

The invention claimed is:

1. A robot hand controller of a robot hand having a plurality of hollow fingers for holding a workpiece, wherein the plurality of fingers comprises at least a first pair of fingers deformed to an opened state and a closed state in response to an air pressure inside of the first pair of fingers and a second pair of fingers deformed to an opened state and a closed state in response to an air pressure inside of the second pair of fingers, the robot hand controller comprising:
    an air supply unit configured to supply air into the plurality of fingers, and configured to discharge air in the plurality of fingers; and
    a controller configured to control the air supply unit, wherein
    the air supply unit includes at least a first air passages and a second air passage, the first air passage configured to make adjustment of the air pressure in the inside of the first pair of fingers and the second air passage configured to make adjustment of the air pressure in the inside of the second pair of fingers, and
    the controller is configured to control the air supply unit to be in a first closed pattern in which the first pair of fingers and the second pair of fingers are made to be in the closed state by the adjustments by the first air passage and the second air passage, and configured to control the air supply unit to be in a second closed pattern in which only the first pair of fingers is made to be in the closed state by the adjustment by the first air passage.

2. The robot hand controller according to claim 1, wherein the controller is configured to control the air supply unit to be in a third closed pattern in which only the second pair of fingers is made to be in the closed state by the adjustment by the second air passage.

3. The robot hand controller according to claim 1, wherein the controller adjusts an opening amount of the fingers in response to an external dimension of the workpiece by controlling a pressure of the air supplied to the fingers through the respective air passages.

4. The robot hand controller according to claim 1, further comprising:
    a storage that stores holding data in which a plurality of kinds of shapes of the workpiece are associated with a plurality of pieces of closing pattern data each of which indicates one of opening and closing for the first pair of fingers and the second pair of fingers, wherein
    the controller controls the adjustments of the air pressures by the first air passage and the second air passage based on the plurality of pieces of closing pattern data.

5. The robot hand controller according to claim 4, further comprising:
    an image processor configured to receive an image of the workpiece from a camera, and to measure a contour of the workpiece, wherein the controller creates the closing pattern data based on the contour of the workpiece measured by the image processor, and causes the storage to store holding data including the created closing pattern data and the contour of the workpiece measured by the image processor.

6. A robot system comprising:
a robot;
a robot hand connected to the robot, the robot hand having a plurality of hollow fingers, wherein the plurality of fingers comprises at least a first pair of fingers deformed to an opened state and a closed state in response to an air pressure inside of the first pair of fingers and a second pair of fingers deformed to an opened state and a closed state in response to an air pressure inside of the second pair of fingers; and
a robot hand controller comprising an air supply unit configured to supply air into the plurality of fingers, and configured to discharge air in the plurality of fingers; and
a controller configured to control the air supply unit, wherein
the air supply unit includes at least a first air passages and a second air passage, the first air passage configured to make adjustment of the air pressure in the inside of the first pair of fingers and the second air passage configured to make adjustment of the air pressure in the inside of the second pair of fingers, and
the controller is configured to controls the air supply unit to be in a first closed pattern in which the first pair of fingers and the second pair of fingers are made to be in the closed state by the adjustments by the first air passage and the second air passage, and configured to control the air supply unit to be in a second closed pattern in which only the first pair of fingers is made to be in the closed state by the adjustment by the first air passage.

7. A method of controlling a robot hand having a plurality of hollow fingers for holding a workpiece, wherein the plurality of fingers comprises at least a first pair of fingers deformed to an opened state and a closed state in response to an air pressure in inside of the first pair of fingers and a second pair of fingers deformed to an opened state and a closed state in response to an air pressure inside of the second pair of fingers, wherein the robot hand includes at least a first air passage and a second air passage, the first air passage configured to make adjustment of the air pressure in the inside of the first pair of fingers and the second air passage configured to make adjustment of the air pressure in the inside of the second pair of fingers,
the method comprising:
    holding the workpiece in a first closed pattern that makes the first pair of fingers and the second pair of fingers be in the closed state by the adjustments by the first air passage and the second air passage; and
    holding the workpiece in a second closed pattern that makes only the first pair of fingers be in the closed state by the adjustment by the first air passage.

\* \* \* \* \*